UNITED STATES PATENT OFFICE.

LUDWIG MOND, OF LONDON, ENGLAND.

COMPOUND OF NICKEL AND CARBON MONOXIDE.

SPECIFICATION forming part of Letters Patent No. 455,229, dated June 30, 1891.

Application filed November 11, 1890. Serial No. 371,098. (No specimens.)

*To all whom it may concern:*

Be it known that I, LUDWIG MOND, manufacturing chemist, a subject of the Queen of Great Britain, of Regent's Park, London, in the county of Middlesex, in the Kingdom of England, have invented a certain new and useful Improvement in Compound of Nickel and Carbonic Oxide, of which the following is a specification.

This invention is a new discovery in science and relates to a new compound of nickel with carbon monoxide. The method of obtaining is as follows:

Metallic nickel, preferably in a very finely-divided state, such as is obtained by reducing oxide of nickel by hydrogen or carbon monoxide at a temperature of 350° to 450° centigrade or by heating the oxalate of nickel by itself to the temperature required for its complete decomposition or any other method, is treated at a temperature below 150° centigrade with carbonic-oxide gas, which may be mixed with other gases, but should be free from oxygen or halogens. The nickel combines with the carbonic oxide and forms a readily volatile compound called "nickel carbon oxide," which is easily carried off by the excess of the gas employed. This compound forms at all temperatures below 150° centigrade, even below 0° centigrade, and is very freely obtained at ordinary atmospheric temperature, but I prefer to work at about 50° centigrade. None of the impurities in the nickel or the oxide, not even the cobalt, are in the least acted upon by the carbonic oxide, but remain behind after the nickel has been volatilized. The treatment is preferably carried on in a chamber or cylinder revolving on a horizontal axis or in one provided with a stirring or agitating device, whereby the pulverulent matter shall be freely and thoroughly exposed to the gas. After some time the action of the finely-divided nickel upon carbonic oxide becomes less energetic. It is then heated up to 350° to 400° centigrade in a current of carbonic oxide or hydrogen and cooled down again to ordinary temperature, by which means its energy is restored.

The vapors of nickel carbon oxide mixed with carbonic oxide, obtained as stated, are condensed by passing them through any convenient cooling apparatus, if desired, under pressure so as to hasten the condensation. It is preferable to effect the condensation at a temperature below 0° centigrade—say 20°—which can easily be effected by artificial refrigeration of the condensing apparatus. In this way the nickel-carbon oxide is obtained as a colorless liquid of the composition $NiC_4O_4$, which boils at 43° centigrade and solidifies at 25°. Its specific gravity is 1.3185 at 17° centigrade.

The vapor of the new compound when heated to 180° centigrade decomposes into nickel and carbon monoxide of the formula CO.

The compound is useful for obtaining pure nickel therefrom either in the form of masses, plates, or tubes, and also for nickel-plating, and these uses form the subject of other applications contemporaneous with this.

I declare that what I claim is—

As a new compound, nickel-carbon oxide, being a compound of nickel and carbon monoxide of the formula $NiC_4O_4$, a liquid boiling at about -43° centigrade under atmospheric pressure, but very volatile in the presence of other gases at ordinary temperatures.

In testimony whereof I have signed my name to this specification in the presence of two subscribing witnesses.

LUDWIG MOND.

Witnesses:
 WM. P. THOMPSON,
 JOHN HAYES.